United States Patent
El-Hamamsy et al.

(10) Patent No.: US 8,217,803 B2
(45) Date of Patent: Jul. 10, 2012

(54) WIRELESS DATA ACQUISITION NETWORK AND OPERATING METHODS

(75) Inventors: Sayed-Amr El-Hamamsy, Calgary (CA); Ronald Gerald Murias, Calgary (CA)

(73) Assignee: SRD Innovations Inc., Calgary (CA)

( * ) Notice: Subject to any disclaimer, the term of this patent is extended or adjusted under 35 U.S.C. 154(b) by 1114 days.

(21) Appl. No.: 12/107,735

(22) Filed: Apr. 22, 2008

(65) Prior Publication Data

US 2009/0261968 A1    Oct. 22, 2009

(51) Int. Cl.
*G08C 19/16* (2006.01)
(52) U.S. Cl. .................................. 340/870.01
(58) Field of Classification Search .............. 340/870.01
See application file for complete search history.

(56) References Cited

U.S. PATENT DOCUMENTS

| | | |
|---|---|---|
| 4,815,044 A | 3/1989 | Deconinck |
| 6,041,283 A | 3/2000 | Sigmar |
| 6,219,620 B1 | 4/2001 | Park |
| 6,424,931 B1 | 7/2002 | Sigmar |
| 6,999,377 B2 | 2/2006 | Burkholder |
| 7,224,642 B1 | 5/2007 | Tran |
| 7,894,301 B2 * | 2/2011 | Eperjesi et al. ............... 367/77 |
| 2006/0178847 A1 | 8/2006 | Glancy |
| 2006/0285149 A1 | 12/2006 | Dei |

FOREIGN PATENT DOCUMENTS
WO    2006/067271 A1    6/2006

OTHER PUBLICATIONS

Lee, W.L., "Flexible-Schedule-Based TDMA Protocols for Supporting Fault-Tolerance, On-Demand TDMA Slot Transfer, and Peer-to-Peer Communication in Wireless Sensor Networks," doctoral dissertation, University of Western Australia, Crawley, Australia, Aug. 2007, pp. 1-312.

* cited by examiner

*Primary Examiner* — Rexford Barnie
*Assistant Examiner* — Tien Mai
(74) *Attorney, Agent, or Firm* — Christensen O'Connor Johnson Kindness PLLC

(57) ABSTRACT

A wireless network is provided, that may comprise wireless sensor units organized in chains of wireless sensor units. Each wireless sensor unit may comprise plural sensors and at least a wireless transceiver connected to communicate by wires or wirelessly with the plural sensors. Each chain of wireless sensor units may include a terminal wireless sensor unit and intermediate wireless sensor units, each intermediate wireless sensor unit being configured to relay data along the chain of intermediate wireless sensor units towards the terminal wireless sensor unit. The terminal wireless sensor unit in each chain of wireless sensor units is adapted to communicate wirelessly with at least one backhaul unit of plural backhaul units; and the backhaul units are adapted to communicate with a central computer.

23 Claims, 12 Drawing Sheets

WIRELESS DATA ACQUISITION NETWORK AND OPERATING METHODS

FIELD

Wireless data networks and their operation.

BACKGROUND

Seismic surveys are extensively used in the oil and gas industry to understand the subsurface and to provide structural images of the geological formation within the earth using reflected sound waves. The results of the survey are used to identify reservoir size, shape and depth as well as porosity and the existence of fluids. Geophysicists and geologists use this information to pinpoint the most likely locations for successfully drilling for oil and natural gas.

The seismic survey is conducted by placing a large number of geophones in the area of interest. They are set up in lines or in grids. Using shakers or small explosives, the ground is shaken and the geophones acquire the reflected sound data from the different sub-layers in the ground. A huge amount of data is collected in a given seismic survey which can cover 40 sq km and take days to gather.

The amount of data which is retrieved during a seismic survey is quite large. In an exemplary case a geophone measures three axes at a sampling rate of 4 bytes per millisecond (each byte is 8 bits giving a resolution of 24 bits which is the accuracy required by the seismic survey). In this case, the data rate per geophone is:

$$4 \text{ bytes/msec} \times 8 \text{ bits/byte} \times 3 = 96 \text{ kbps (Kilobits per second)}$$

If the survey is using 1000 geophones, the data rate is then 96 Mbps (Mega bits per second). Because wireless systems have overhead and error correction to operate reliably, even the highest data rate broadband wireless systems can't accommodate this data rate in traditional configurations such as point to multipoint or pure mesh systems.

Several patents are known that use wireless links in a seismic network, including U.S. Pat. Nos. 6,424,931; 6,041,283; 6,219,620; and 7,224,642. However, there is room for improvement in the manner in which data is collected and delivered for processing.

SUMMARY

Methods and apparatus for collecting data from a wireless sensor network are provided. The methods and apparatus apply for example to seismic networks, but may be applied to other wireless sensor networks.

In one embodiment, a wireless network is provided, that may comprise wireless sensor units organized in chains of wireless sensor units. Each wireless sensor unit may comprise plural sensors and at least a wireless transceiver connected to communicate by wires or wirelessly with the plural sensors; each chain of wireless sensor units including a terminal wireless sensor unit and intermediate wireless sensor units, each intermediate wireless sensor unit being configured to relay data along the chain of intermediate wireless sensor units towards the terminal wireless sensor unit; the terminal wireless sensor unit in each chain of wireless sensor units being adapted to communicate wirelessly with at least one backhaul unit of plural backhaul units; and the backhaul units being adapted to communicate with a central computer.

In another embodiment, a method of collecting data from wireless sensor units arranged in a network is provided in which the wireless sensor units are organized in chains of wireless sensor units. Each chain of wireless sensor units may include a terminal wireless sensor unit and intermediate wireless sensor units. The method may comprising the steps of initiating distribution of control signals to the wireless sensor units; acquiring data with the wireless sensor units by sensing one or more physical parameters; each of the wireless sensor units transmitting the acquired data in response to the control signals along at least one of the plural chains of wireless sensor units towards a corresponding one of the terminal wireless sensor units; each of the terminal wireless sensor units forwarding the acquired data from the wireless sensor units in the corresponding chain to at least one of plural backhaul units; and each of the backhaul units collecting and forwarding the acquired data from the terminal wireless sensor units towards a central computer.

Methods of prioritizing sending of data in wireless sensor networks are also provided.

These and other aspects of the network and method are set out in the claims, which are incorporated here by reference.

BRIEF DESCRIPTION OF THE FIGURES

Embodiments will now be described with reference to the figures, in which like reference characters denote like elements, by way of example, and in which.

DETAILED DESCRIPTION

Figure 1:
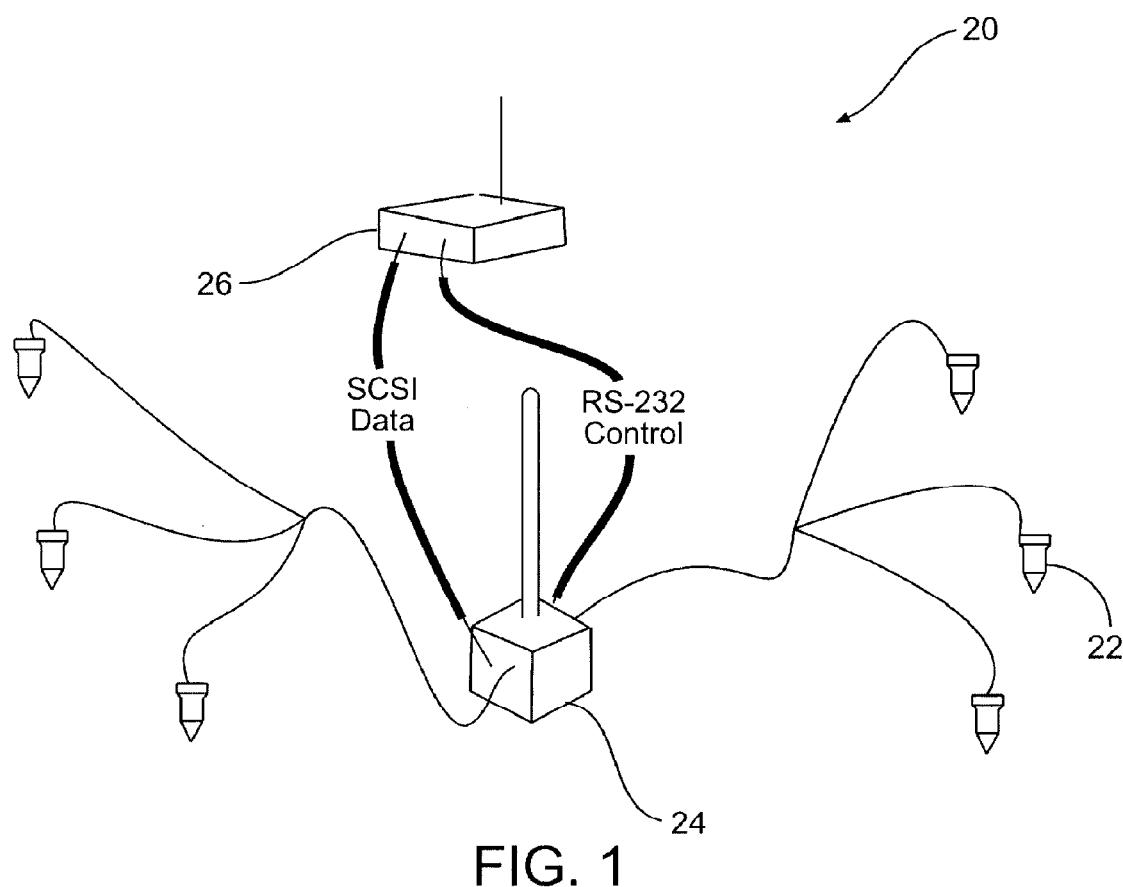
FIG. 1 shows an exemplary wireless sensor unit which includes a wireless capable data collection box connected to several sensors, in this case, geophones.

FIG. 1 illustrates a wireless sensor unit 20. Many different wireless sensor configurations may be used. In the example shown, wireless sensor unit 20 comprises several sensors 22, in this case six, connected by wires to a data collection box 24. The data collection box 24 is wired to a wireless transceiver 26. In some embodiments, instead of six sensors, there may be one or more sensors. In some embodiments, the wired connections shown in FIG. 1 may be wireless. In some embodiments, any combination of the sensors 22, data collection box 24 and wireless transceiver 26 may be incorporated in a single housing. In some embodiments, the sensors 22 may be geophones.

In FIG. 1, the data collection box 24 is connected to six digital geophones 22 capable of sampling data from three directions—X, Y, and Z. There are 3 geophones 22 connected in series and attached to each side of the box 24 via a cable. Each geophone 22 may for example sample the signal at 1 millisecond (ms.) interval, and each sample consists of 4 bytes of data per millisecond. The wireless transceiver 26 may be connected to the data collection box 24 via RS-232 and SCSI ports. These connections may be generalized to other types of ports including (but not limited to) USB, FireWire, parallel, synchronous serial, etc.

Since there are 3 directions of motion sampled simultaneously, the data acquisition rate per geophone is 4 bytes/msec×8 bits/byte×3=96 kbps (Kilobits per second)

With 6 geophones 22 attached per box 24, the data rate received by a box is therefore 576 kbps.

In a seismic network, the acquisition may occur over a period ranging from a minimum of 5 seconds to a maximum of 20 seconds, each acquisition followed by an 8 second interval. Therefore the data rate to be transmitted back to the central control unit will have a minimum data transmission rate of $$\frac{576\,kbps \times 5\,\sec}{5 + 8\,\sec} = 222\,kbps$$

And a maximum of $$\frac{576\,kbps \times 20\,\sec}{20 + 8\,\sec} = 412\,kbps$$

Therefore the maximum data rate for real time data transmission is 412 kbps per box 24. Given that there are sometimes hundreds of boxes 24 active at the same time, the amount of data flowing simultaneously through the network at the time of acquisition is quite substantial and requires careful management of the data flow throughout the network. Embodiments disclosed here are intended to provide real-time transmission of the data if required. Real-time in this case being defined as data transmission occurs substantially during the seismic data acquisition period. The network may offer the user the ability to tailor the performance to their specific requirements and their specific application. In some cases, they may not need to meet the real time requirement and the system enables the user to utilize it in a non-real time way.

In an embodiment, a hybrid wireless mesh/cellular network configuration may be used with standards-based equipment. Equipment based on the standards can be configured to operate at different frequencies, thus allowing for extremely high data rates while avoiding problems of self-interference or limited bandwidth. However, any type of radio may be used which has the capability to transmit the amount of data required and is capable of being connected in mesh or cellular networks. As an example of a custom radio with such capabilities, Wi-LAN's VIP 110-24 is capable of forming a mesh network as required by this invention even though it is not based on a standard product.

In an embodiment, a Hybrid Mesh network system uses wireless units based on IEEE 802.11g standard capable of transmitting 36 Mbps (we will use an effective bandwidth of 27 Mbps to account for overhead) of data to distances determined by the following Friis equation:

$P_r = P_t G_t G_r (\lambda/4\pi R)^2$, where:

$P_r$ is the received power,
$P_t$ is the transmitted power,
$G_t$ is the transmitter gain,
$G_r$ is the receiver gain,
R is the distance between routers, and
λ is the signal wavelength.

With 20 dBi transmit power, 36 Mbps links up to 500 m away can be attained within the advertised required fade margin of a typical off-the-shelf router, or, 24 Mbps links may be attained up to 1,000 m with a fade margin within the advertised required fade margin of a typical off-the-shelf router. By using a mesh configuration, each box is able to receive data from another box in its immediate vicinity and re-transmit it to a box further down the line until all the data from all the boxes reaches its final destination. Boxes that are downstream from others have to transmit their own data as well as the data received from the boxes located upstream from them. At the network level, this means the total transmit time is equal to approximately half the time available. As a result the total number of boxes that can be connected in a single line or in a mesh configuration could be limited to about 32 boxes. Thus for every 32 boxes we will need a backhaul unit to get the data back to the central control unit. Furthermore, because of certain system inefficiencies, we may have to limit this to a maximum of 25 boxes per each backhaul unit. A backhaul unit comprises a transmitter and a receiver with highly directional antennas. These are clearly exemplary numbers.

A mesh network architecture may be used either to connect geophones directly to each other, or to relay boxes, which are in turn connected to a data collection van some distance away. In some embodiments, higher level mesh networks are overlaid upon these local mesh networks in a backhaul network based on a more cellular approach.

A hybrid mesh network configuration is very well suited for seismic surveys. In one embodiment, the network self-configures into linear meshes by means of each unit discovering and connecting to its nearest neighbors. All of the mesh units may use omni-directional antennas (antennas which cover 360 degrees of azimuth). If deployed, the backhaul units may use directional antennas with relatively wide beamwidths, say, 90 degrees or 120 degrees, to increase antenna gain and reduce interference. This allows them to be pointed in generally the right direction but without requiring an enormous amount of setup.

Figure 3:
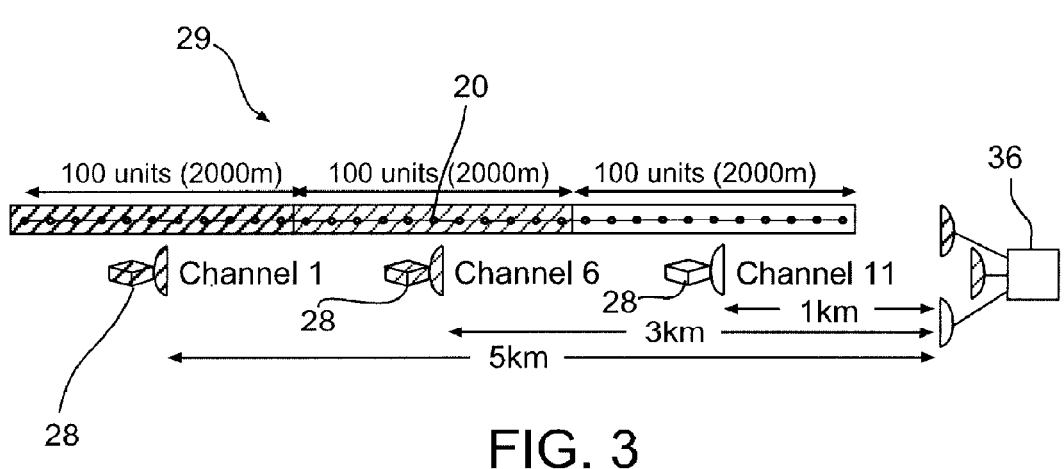
FIG. 3 shows a 2D wireless network with wireless links to feed data back to a control van.

In FIG. 3, wireless sensor units 20 in plural chains of wireless sensor units 20 in a wireless mesh network 29 communicate with each other and one of the wireless sensor units 20 communicates with a corresponding backhaul unit 28. While the backhaul unit 28 is shown more or less centrally in relation to its corresponding chain of wireless sensor units 10, the backhaul unit 28 may be located at the end of its corresponding chain, as in FIG. 6 or in any other suitable location. The backhaul units 28 in turn relay data from the wireless sensor units to a central control unit 36. In this case, IEEE 802.11g may be used for the mesh network 29 and IEEE 802.11a may be used for backhaul.

One implementation involves connecting a number of geophones to each other using short-range radios, and a relay box may incorporate a compatible short-range radio to collect the data from locally placed geophones and relay the data via a second mesh based on a longer-range radio (e.g. IEEE 802.11g). The maximum number of relay boxes is then determined by the capacity of the longer-range radio. When that number is reached, a backhaul unit would then transmit all the data collected in either a cellular network or a point-to-point link (e.g. IEEE 802.11a or 802.16) back to a computer at the control truck for collection, storage and interpretation. The backhaul units would also have two radios: one radio to communicate with the last relay box in the mesh and the second radio to relay data to the control truck.

Figure 4:
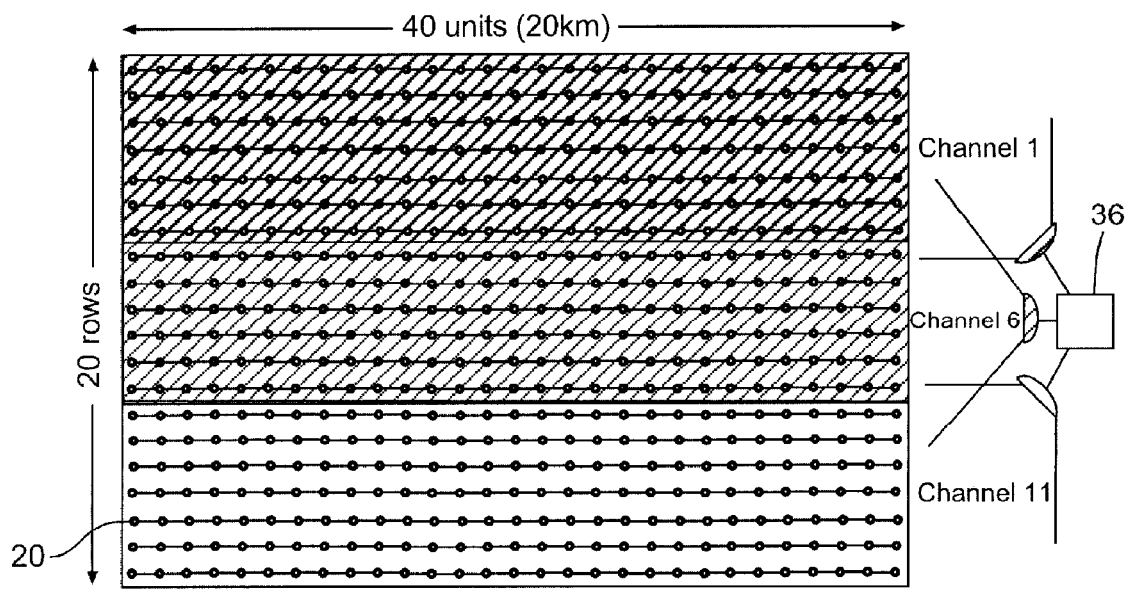
FIG. 4 shows a 3D wireless network with wireless links to feed data back to a control van.

In FIG. 4, a 3D wireless network is shown in which wireless sensor units 20 communicate through respective backhaul units 28 (see FIG. 3), and the backhaul units communicate with a control truck 36. In this case, short-range radio such as IEEE 802.15.4 may be used to provide a wireless connection between the geophones and the box in each wireless sensor unit 20, longer-range radio such as IEEE 802.11g may be used for the mesh network (communication between wireless sensor units 20), and an alternative system on a separate channel, such as IEEE 802.11a may be used for backhaul to the control truck 36.

Figure 5:
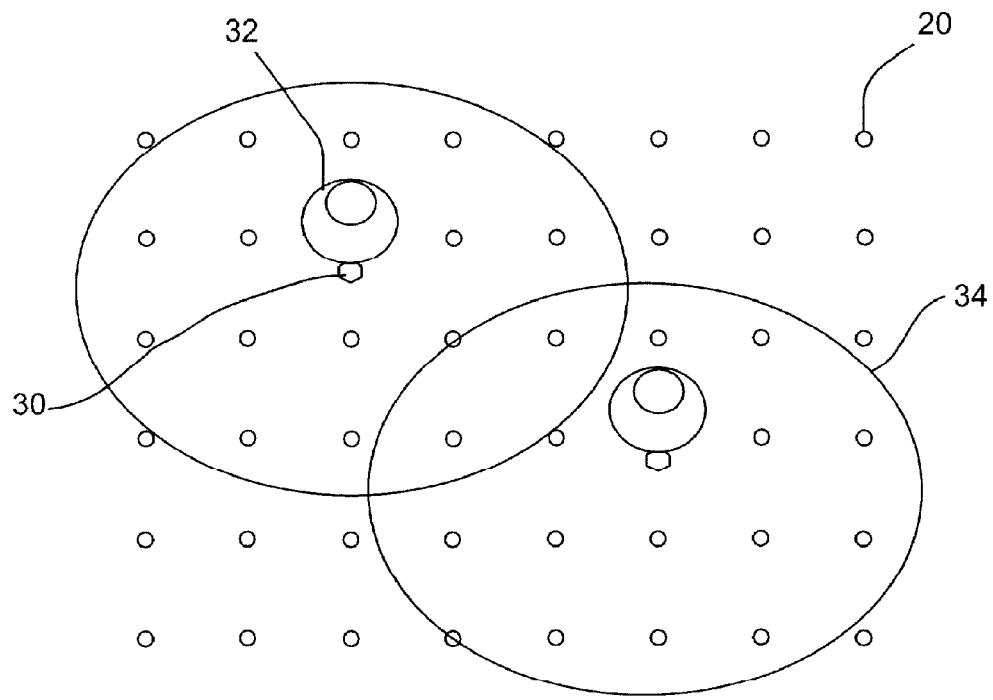
FIG. 5 shows a wireless network with balloon based coverage.

Another method is shown in FIG. 5, in which a tethered (or un-tethered) balloon carrying carries a wireless mesh node. The node 30, functioning as a backhaul unit, attached to the balloon 32 would be within range of the sensor units 20 in a large geographical area 34 and therefore would provide excellent coverage of rough terrain. Each node 30 communicates with the control truck 36 (see FIG. 6).

The wireless sensor unit 20 may use off the shelf components modified according to the disclosed methods. The mesh network provides a virtual connection between the control van and each data collection box in the field.

The hybrid mesh network may be applied both to existing analog geophones and to future digital geophones. Future implementations may require the use of short-range radio equipment to create the small local network using a number of geophones. One such short-range radio is the IEEE 802.15.4 (ZigBee) system. Although the 802.15.4 system has too low a throughput and range to handle the full survey, it has enough capability to connect a few geophones 22 (which are less than 100m apart and which require an aggregate data throughput of less than 256 kbps, a relatively low data rate). Thus, in one embodiment, a limited number of geophones 22 are connected to each other, transmitting all their data to a box 24 with a higher-capacity (e.g., 802.11g) radio 26. The box 24 incorporates memory to buffer the data. This memory could be a hard drive, flash memory, or some other storage device, depending on the requirements of the system. The boxes 24 are then connected to their own mesh network as described above, and the data is backhauled using either other channels of the local system (e.g., 802.11g) or some other (IEEE 802.11a, IEEE 802.16, cellular) backhaul.

In the case where the system is being retrofitted to analog geophones, the radios 26 or the data control box 24 may incorporate an Analog-to-Digital converter to enable the digitization of the data from the geophones.

Figure 6:
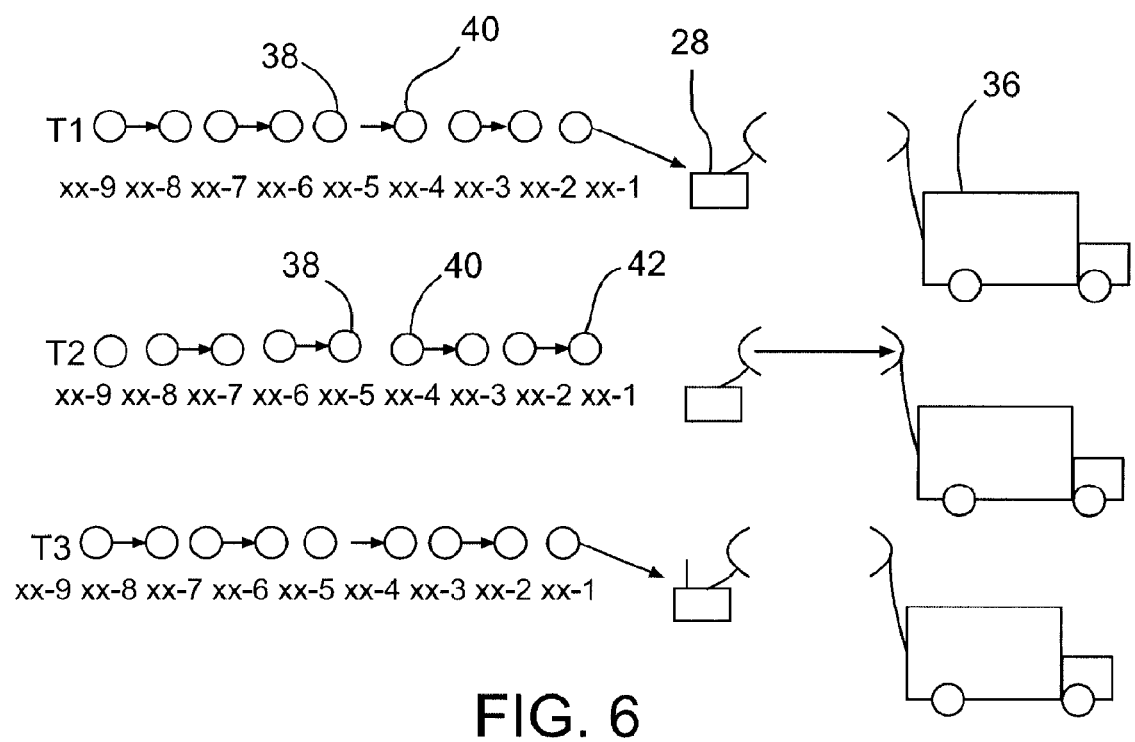
FIG. 6 shows a wireless network operation.

In FIG. 6, a method of operation of the network is disclosed. At t1 the odd numbered radios 38 transmit while the even numbered ones 40 receive. In this example, the backhaul radio 28 is receiving therefore the control truck 36 radio is idle. Then at t2, the even numbered radios 40 are transmitting and the odd numbered ones 38 are receiving. In this case the last radio 42 in the line is idle, while the backhaul radio is transmitting the data it has collected to the control truck. Then at t3 the same situation as t1 occurs and so on until all the data has been transmitted back to the control truck.

As shown in FIG. 6, when the network self-configures after installation, each radio may be allocated a number representing its location in each line. For example, radio number 25 in line 1 would be allocated "1-25". This numbering may start from the radio closest to the backhaul unit, which would be number xx-1. As soon as the seismic acquisition begins, all odd numbered radios begin transmitting and all even radios receive. Radio number 1 transmits to the backhaul unit. Once they have transmitted all their data, the odd numbered radios receive while the even ones transmit. The transmission is always from number N to number N−1. Thus, the data is passed on from one radio to the next. The radios downstream effectively relay all the data for their system as well as all other systems upstream from them. Each unit has sufficient data storage to buffer the data it receives prior to the next transmission. This process continues until all the acquired data has been collected at the control truck. Control truck 36 is shown for each chain of wireless sensor units 20, but generally, there will be a single control truck 36, with a computer system, and one or more radios as required by the connection to the backhaul units. The connection to the backhaul units may be wired or wireless.

Figure 7:
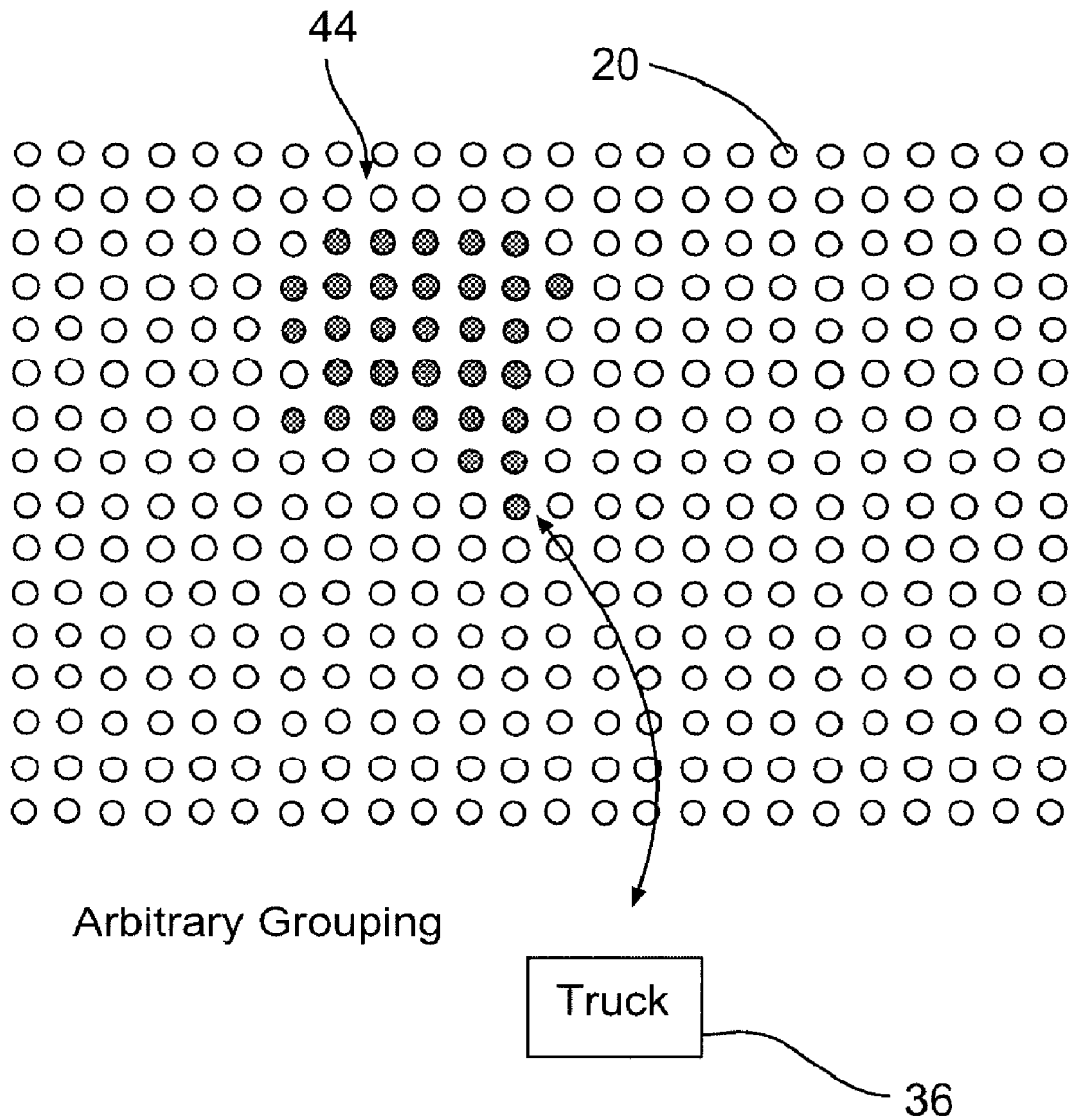
FIG. 7 shows an example of arbitrary grouping of wireless sensor units that allow the operator to selectively pull data from an arbitrary group of boxes.

Another technique is to group seismic boxes 20 based on their location in the mesh. This technique is shown in FIG. 7. In order to reduce mesh relay loads, groups 44 are configured so that data sent from a remote box to the control van uses a "quiet" path through the mesh and through backhaul units 28 (FIG. 3). This way, several boxes may download their data without causing excessive collisions in the network.

Figure 2:
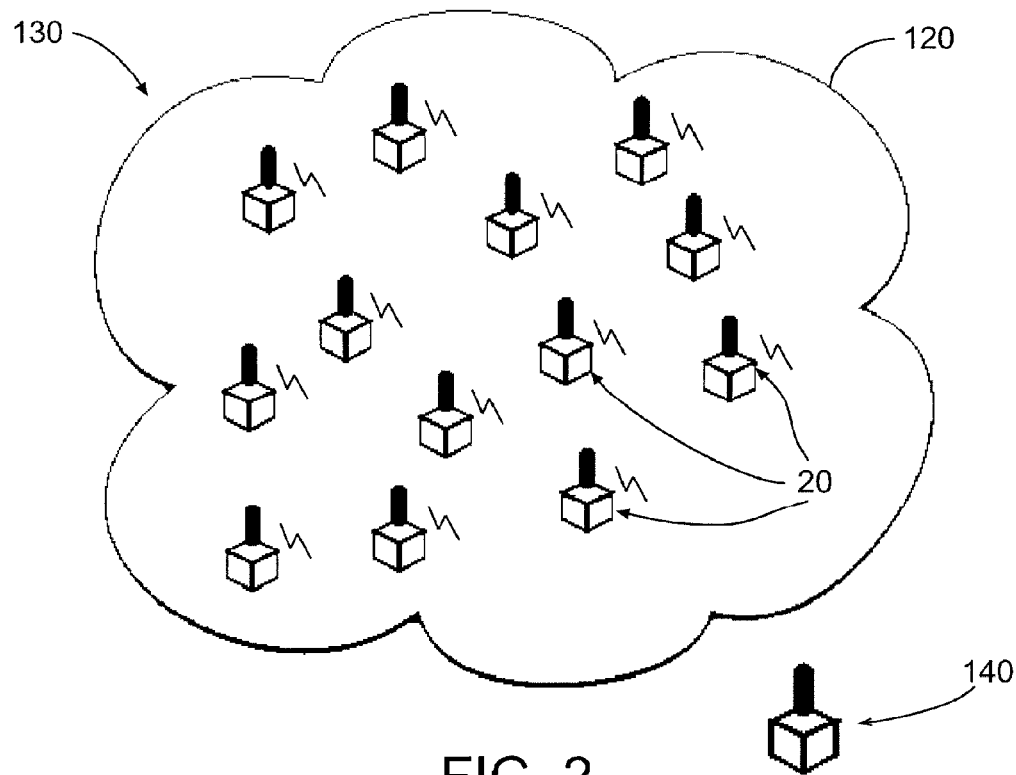
FIG. 2 shows an exemplary distribution of wireless sensor units in a wireless mesh network.

One issue with wireless replacement of data collection cables is the large amount of bandwidth required for every seismic data record. Immediately following each seismic event (usually triggered by an explosive device or other physical means to send a seismic shock wave into the area being measured), a very large amount of data is ready for transmission back to the data collection equipment. Because all of the sensors are triggered by the same event, the wireless network suddenly goes from a quiescent state to near or beyond capacity. FIG. 2 shows a mesh 130 of sensor units 20 triggered by an event 120 so that most of the units have data and are active 110, while some units 140 may not have received data or may have already transmitted their data.

In order to prevent the overloading of the network, a random back-off may be used in some embodiments to stagger the start of transmission for each set of sensors in the array. The unique condition where a starting point is well defined allows a predictable uniform distribution of data upload start times throughout the array of sensors. Each mesh device delays in step 54 transmission of its own data for an amount of time generated randomly in step 52, based, for example, on the device's serial number or a timer. Timing may be initiated at the detection in step 50 of the start of a new seismic event. Although the device may be relaying data from other parts of the mesh, during the timer period, the device does not inject its own data into the mesh. Once the time-out period has been reached, the device begins in step 56 to transmit its own data (in addition to relaying any other data passing through the mesh) to the control van.

Figure 8:
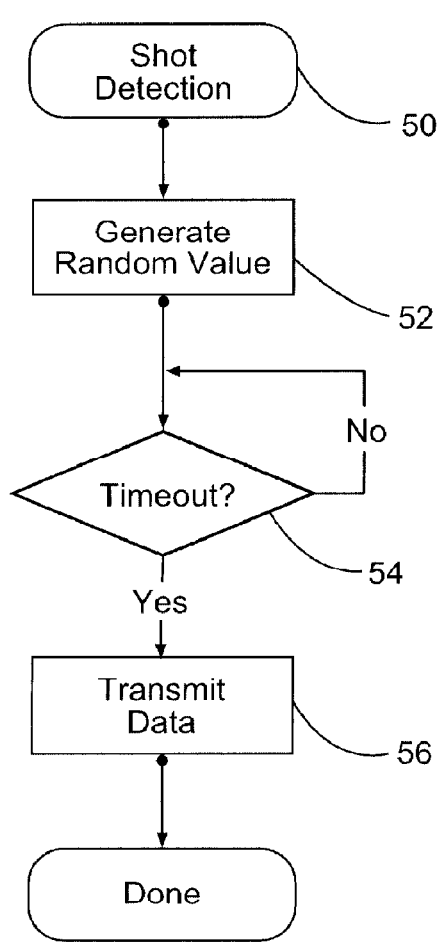
FIG. 8 shows an algorithm for prioritizing sending of data from wireless sensor units over a wireless network, in this case using a random back-off algorithm.
Figure 9:
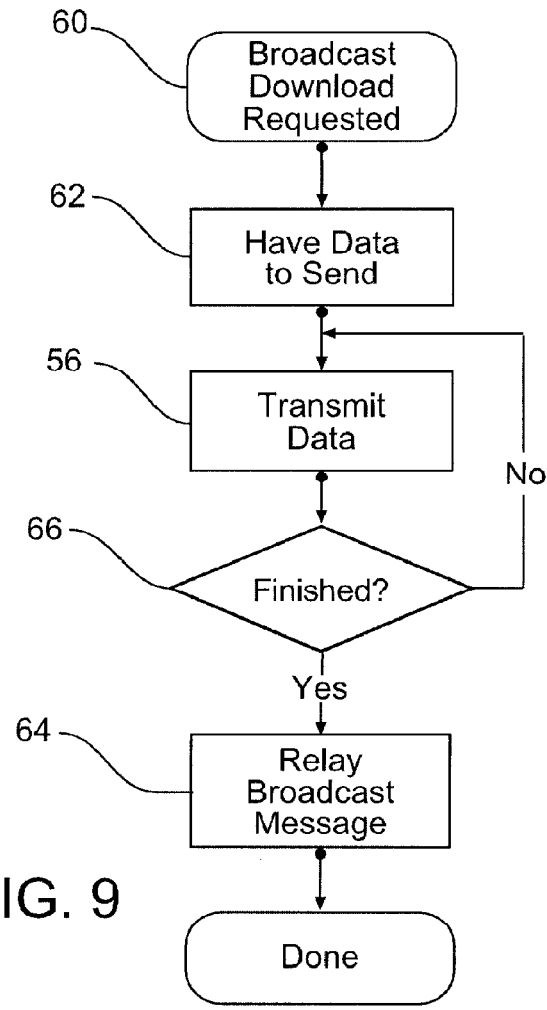
FIG. 9 shows an algorithm for prioritizing sending of data from wireless sensor units over a wireless network, in this case using a greedy download algorithm.

The Usage is generally extensible to any triggered event that will cause a significant increase in bandwidth usage due to the plurality of devices all attempting to communicate simultaneously (triggered by the event). The algorithm for this technique is shown in FIG. 8.

There are cases where the control may initiate a full download of all mesh data. Using a broadcast message, each box is instructed in step 60 to transmit all of its data back to the control van. The execution of this command would result in a flood of network traffic and a very high collision rate. In order to reduce the collision rate, each box employs a "greedy" technique to ensure that its data is transmitted before it has to relay data from other boxes.

To employ this technique, the box examines broadcast messages before relaying them to nearby nodes. If in step 62 the broadcast message is a download message and the box has data to download, the box initiates the download procedure 56 but does not relay in step 64 the broadcast message until in step 66 its download is complete.

PERFORMANCE EXAMPLES

Example 1

If each mesh node 70 is within range of two other nodes, and the control van 36 is within range of four mesh nodes, this technique results in a linear download where only one node in each chain is downloading at a time. Nodes further down the chain are idle, and nodes between the downloading box and the control van are relaying one box's data. At the control van, the four mesh nodes within range would be simultaneously transmitting data, which is a very light load.

Example 2

Figure 10:
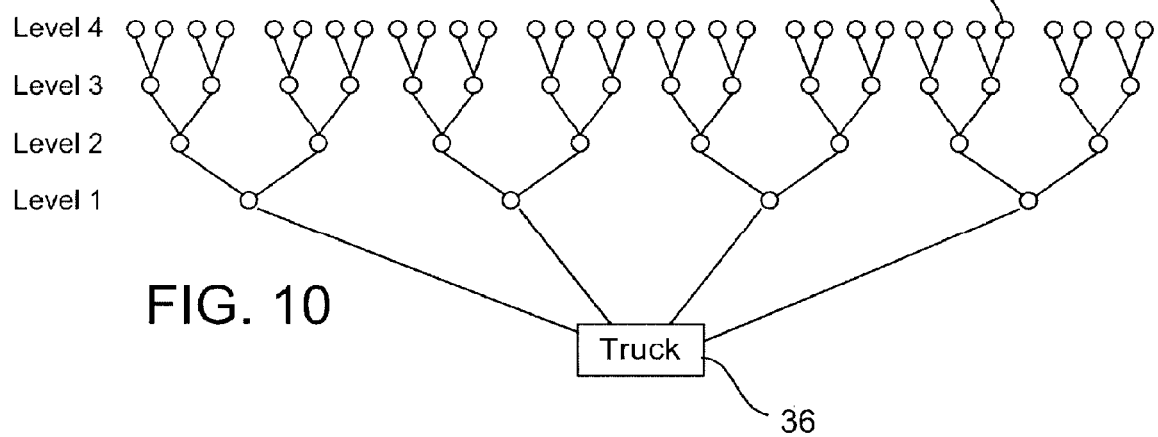
FIG. 10 shows a scenario in which a greedy download algorithm may be used.

If each mesh node 70 is within range of three other nodes and the control van 36 is within range of four mesh nodes, the first four nodes in the chain download their data before passing the broadcast message to the links following in the chain. If each node reaches two other nodes further down the chain, this results in eight nodes simultaneously transmitting at the second level, and the amount of data simultaneously transmitted doubles with each additional layer. In this scenario, if there are two hundred (200) boxes in the field, the first download cycle has four devices transmitting simultaneously, the second cycle has eight, the third has sixteen, and so on. After five cycles of downloading and broadcast message forwarding, the field of devices has downloaded all data. On the fifth cycle, 64 boxes are simultaneously transmitting back to the control van. On the sixth cycle, 76 boxes are simultaneously transmitting back to the control van. This technique is illustrated in FIG. 10.

Although Example 2 still results in a large link load as the broadcast message spreads through the network, it is still far better than if the broadcast message reached all nodes at roughly the same time. Further, the most typical network configuration is that of Example 1, where nodes are chained in a linear fashion and rarely can a given node see more than the node linking it to the control van and one other node further out in the field. Finally, if there are many other nodes in the vicinity, other transmission reduction techniques outlined in this disclosure can be used to reduce the network load.

This technique may be extended to groups within the network. A group of boxes may be defined as a subset of the entire network. This group may be a cluster physically located near each other, it may be a set of strategically placed nodes throughout the network, or it may be some other arbitrary grouping. The broadcast message may still be required to initiate download, but nodes not in the group would simply relay the message. Allowing grouping provides more flexibility for data retrieval and also presents another technique for reducing network load. If, in the above Example 2, there were four groups defined for the 200 nodes, the size of each group is 50 nodes. The maximum download load would then be 22 simultaneously transmitting nodes. Once the operator has finished receiving data for a group, a broadcast message may be sent, initiating download for a new group.

Transmission Load Reduction Using Interlacing

The interlace techniques defined here are methods of reduction of the initial amount of data to be transmitted, while maintaining a quality of information that will be useful to an operator to determine an estimated quality of the incoming data as well as knowledge that the sensors and system are operating as expected. This may be accomplished using one or more of the specific techniques listed below. Generally, the method is to prioritize specific data to be sent immediately, and remaining data is sent on a low priority basis. Selecting the higher priority data using one of the methods listed below will allow the operator to receive real time information on the current shot without burdening the network with lower priority data. Once the network settles down from the initial burst of data, the lower priority data can be sent for a more detailed or higher resolution picture of the seismic measurements.

Figure 11:
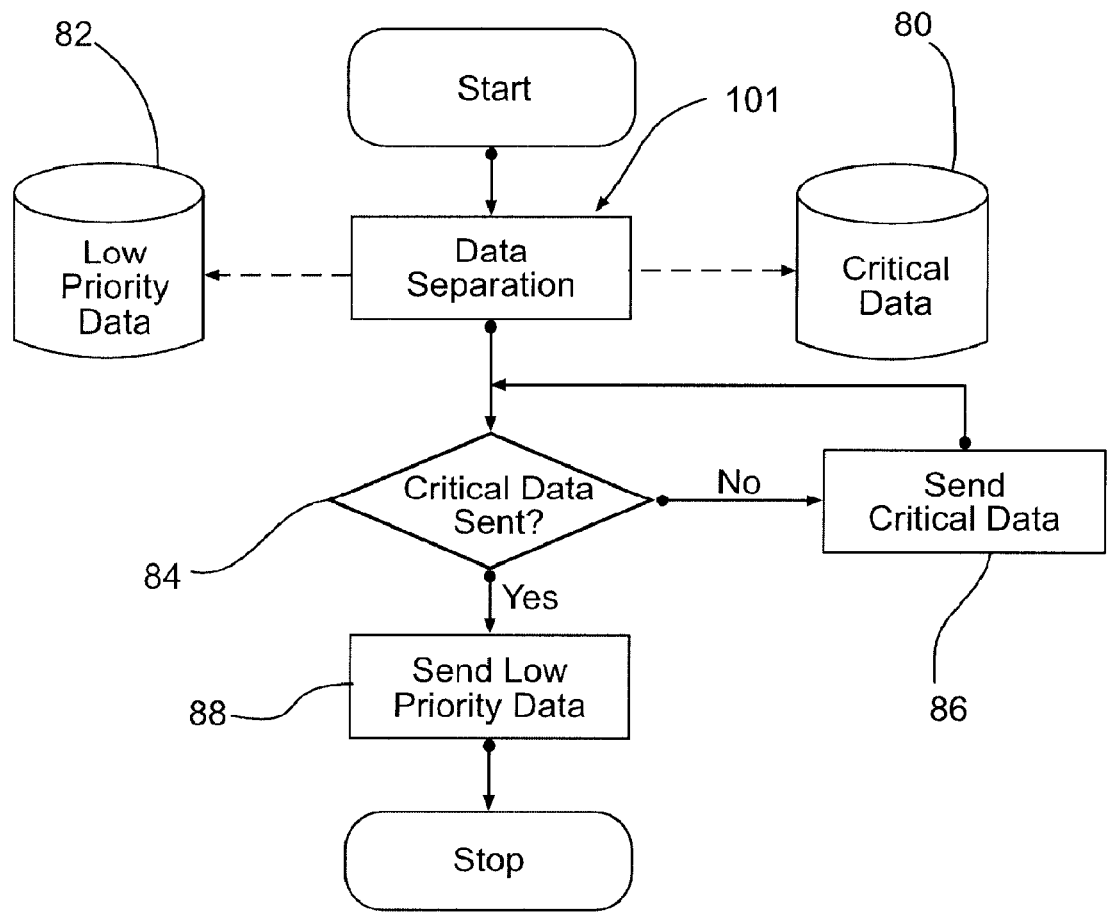
FIG. 11 shows an algorithm for prioritizing sending of data from wireless sensor units over a wireless network, in this case sending high priority data first, then following with low priority data.

FIG. 11 shows an embodiment of a prioritization algorithm, where a data reduction method is applied and all critical data are sent before non-critical data. The data is separated in step 101 into critical data 80 and non-critical data 82. While in step 84 the critical data has not all been sent, the wireless sensor unit 20 sends in step 86 critical data 80. Once all the critical data is sent, it sends in step 86 non-critical data 82.

Figure 12:
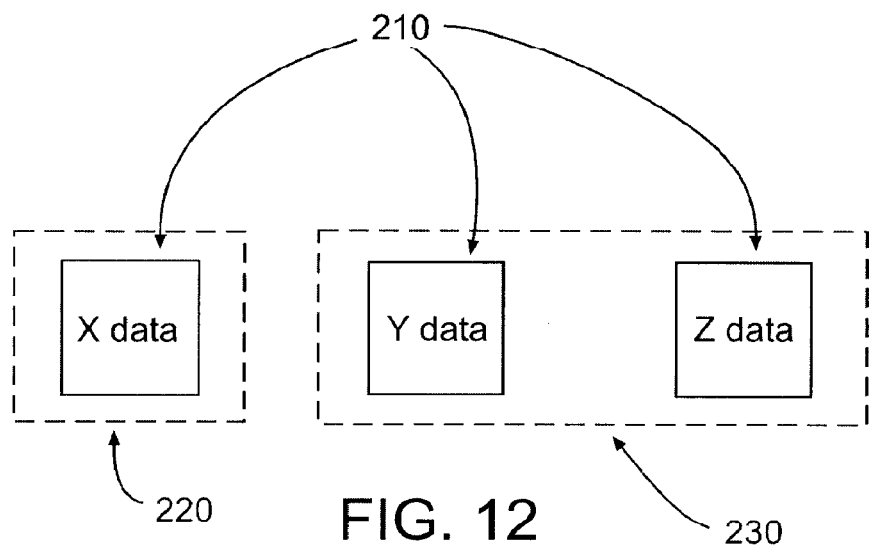
FIG. 12 shows a data prioritization method: Send critical 'X' data first, and then follow later (or offline) with low priority 'Y' and 'Z' data.

A three-dimensional seismic sensor produces data samples for the X, Y, and Z axis at a given sample rate per second. For immediate (short-term) analysis of the overall quality of the data record, only one dimension (say, the X axis) may be required. By assigning high priority to X axis samples, the data collection equipment is assured a much faster response (and analysis) of the data. Lower priority data (say the Y and Z axis data) would be uploaded between shots or during pauses in active seismic collection. FIG. 12 shows the original X, Y, and Z data 210, which have been separated into critical X data 220, and non-critical Y and Z data 230.

The Usage is generally extensible to any triggered event that will cause a significant increase in bandwidth usage due to the plurality of devices all attempting to communicate simultaneously (triggered by the event), and where the data could be categorized according to short and long term value.

Figure 13:
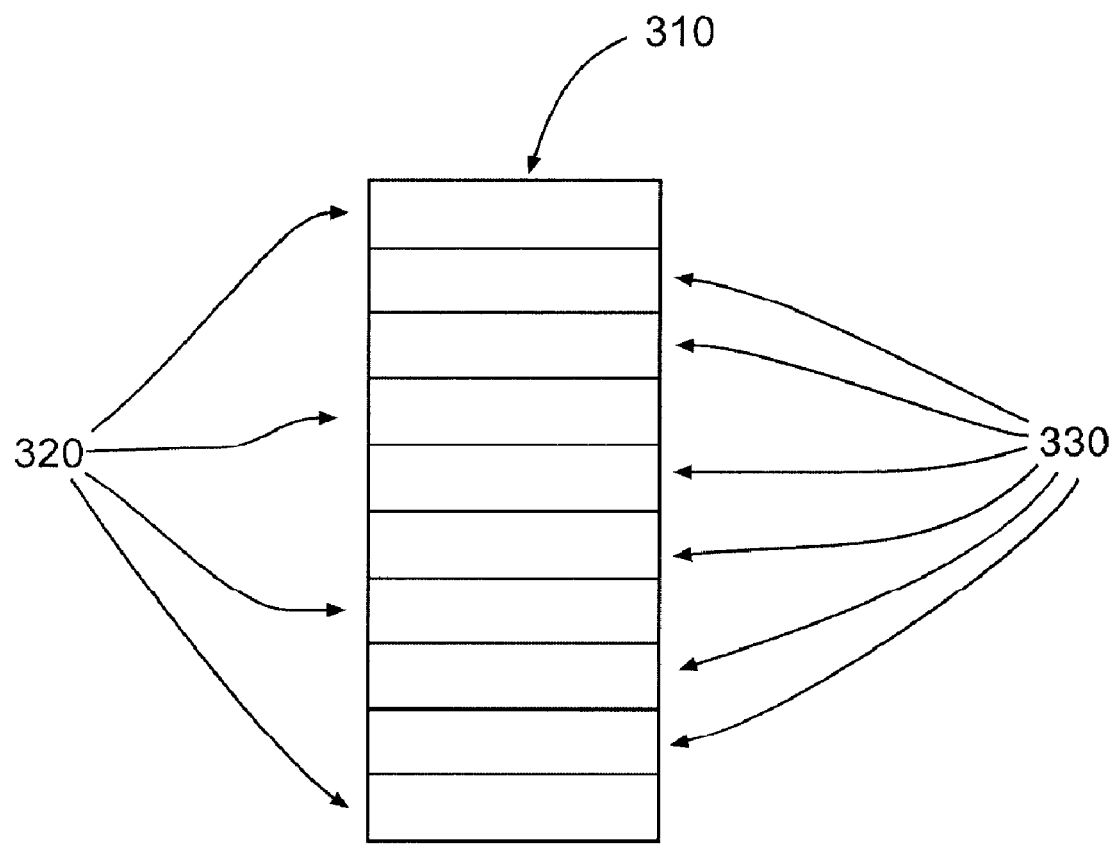
FIG. 13 shows a data prioritization method using interlaced data samples: Send "320" data first, then follow later with "330" data.

Extensible Usage 1: Interlaced Data: Data to be uploaded is all of "equal value" but may be decimated for a lower resolution (but still useful) sample of the overall data quality. Decimation is performed before the wireless uplink and the remaining data are transmitted between shots or during pauses in active seismic collection. In FIG. 13, there is a 3-1 reduction in the amount of critical data sent, as the original burst 310, is reduced by first selecting periodic or aperiodic data 320, for initial transmission, then selecting the remaining data, 330, for transmission at lower priority.

Figure 14:
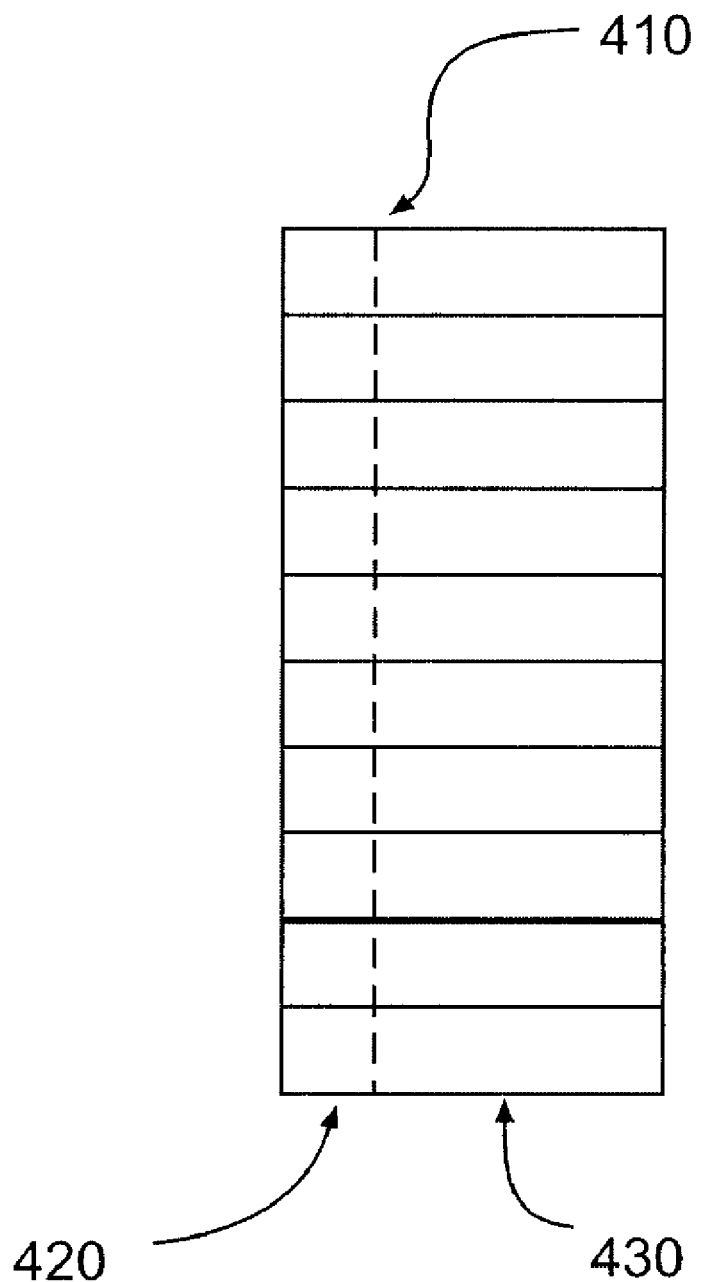
FIG. 14 shows a data prioritization method using resolution reduction: Send "420" data first, then increase the resolution later by sending "430" data.

Extensible Usage 2: Reduction of Resolution: As shown in FIG. 14, initial upload data, 410, is reduced in size by trimming the lower order bits 430 of each word, effectively reducing the resolution of the information. High order bits 420 are transmitted first, and the remaining bits are transmitted between shots or during pauses in active seismic collection.

Figure 15:
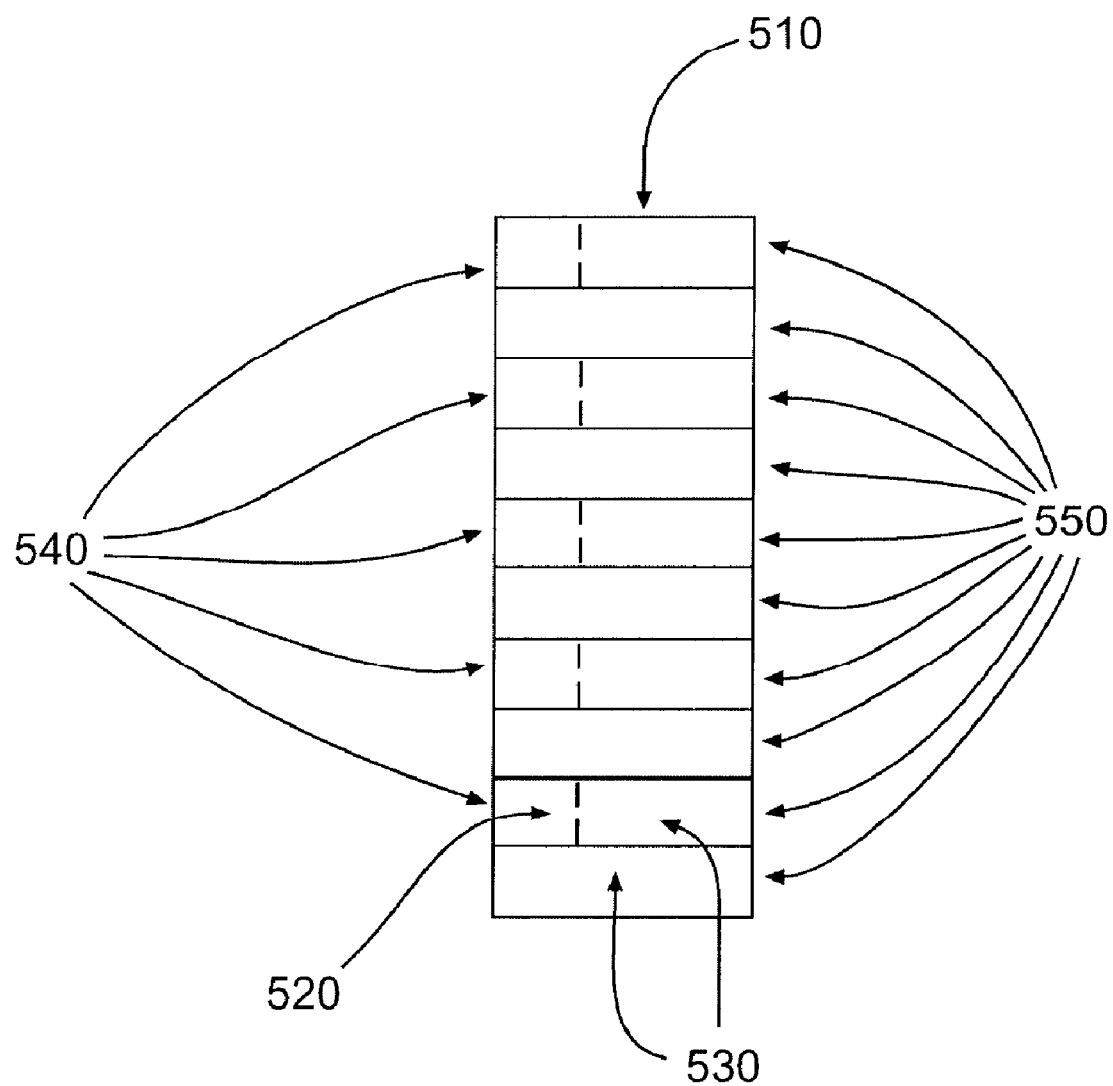
FIG. 15 shows a combination of prioritization methods: Send High bits (520) of interleaved words (540), then follow later filling in with higher resolution and more data.

Extensible Usage 3: Combination of Interlacing, Reduction of Resolution (see FIG. 15): Data size is further reduced by a combination of the techniques described above. The interlacing described above is performed, and the reduction of resolution is used on the original data, 510, to create high priority data 520, and low priority data 530. The high priority interleaved data 540, is sent first, and then the low priority interleaved data 550 is sent later, as time permits.

Power Saving Methods

Conventional seismic data collection is performed through wired connections between the seismic sensors and the data collection and analysis equipment. One issue with wireless replacement of data collection cables is power consumption. Batteries power the remote systems, but these batteries must be able to provide power for 2-3 days of use, even in extremely low temperatures. Because the data processing devices and radio equipment represent a large draw on the available power supply, it is critical to minimize power consumption wherever possible. While there exist methods for reduction of power consumption in radio devices such as cellular telephones, the characteristics of the seismic collection system present opportunities for unique new methods for power saving.

Power saving can be accomplished by turning off any unused devices at the appropriate time. Prior art often focuses on methods of "wakening" a system that is in low power consumption (or "sleep") mode, including techniques where the device periodically wakes up and transmits a message to see if the system should become active, or wakes up, receives, and decodes messages looking for indications that data is ready to be transmitted or received. Embodiments of a wireless data network are disclosed that allow power saving modes to operate efficiently.

Figure 16:
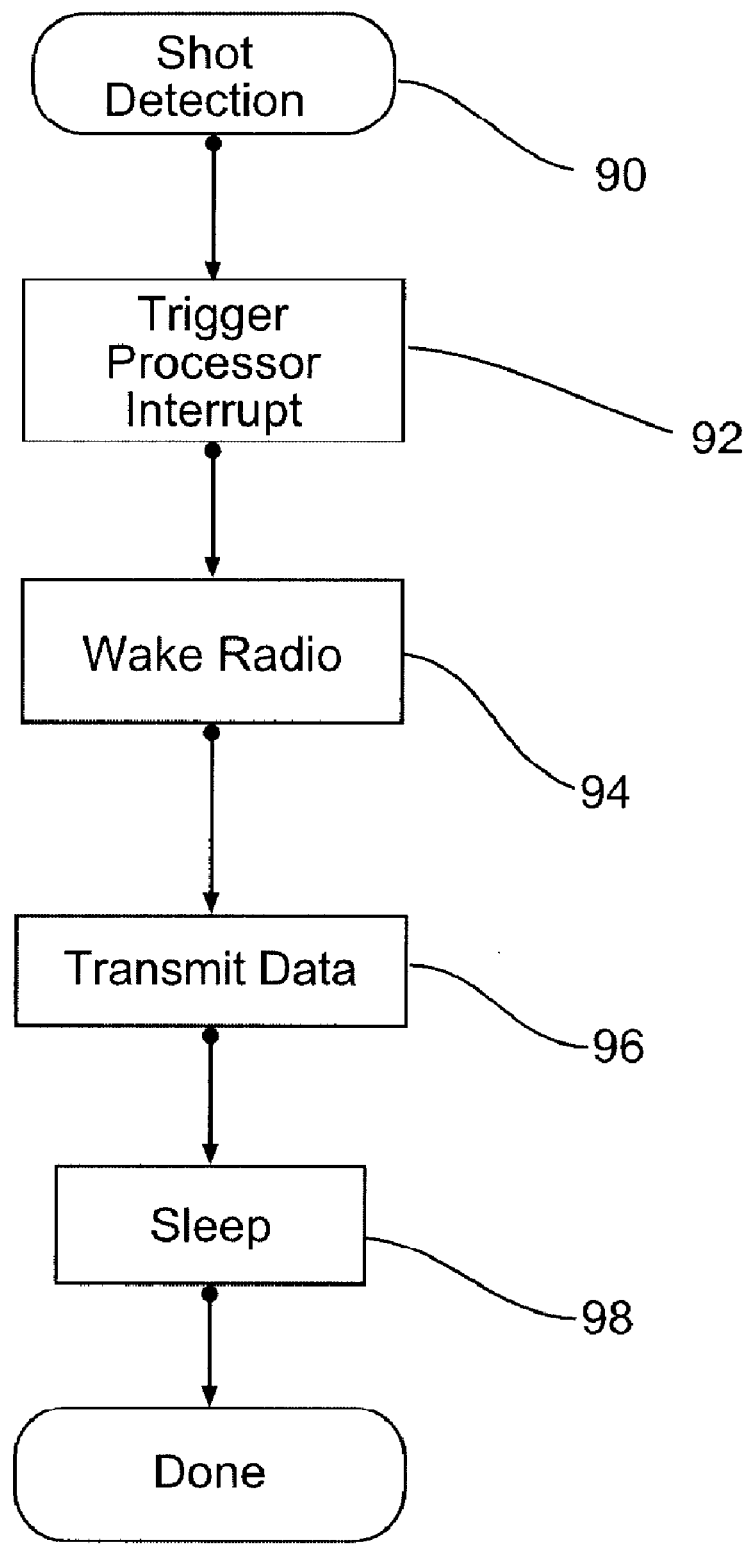
FIG. 16 shows a method of awakening wireless sensor units from sleep.

Immediately following each seismic event (usually triggered by an explosive device or other physical means to send a seismic shock wave into the area being measured), a very large amount of data is ready for transmission back to the data collection equipment. Because all of the sensors are triggered by the same event, this event can also be used to switch the wireless portion of the system from sleep state to functional state. When a sensor detects an event in step 90, it triggers a processor interrupt in step 92 to take the radio out of sleep mode in step 94. The radio then transmits data in step 96 and then returns to sleep mode in step 98 (see FIG. 16). Because the radio system is not required to periodically check for network status, and because a given radio may enter sleep mode immediately after it has finished uploading its data, power save mode is much more efficient than conventional techniques.

Figure 17:
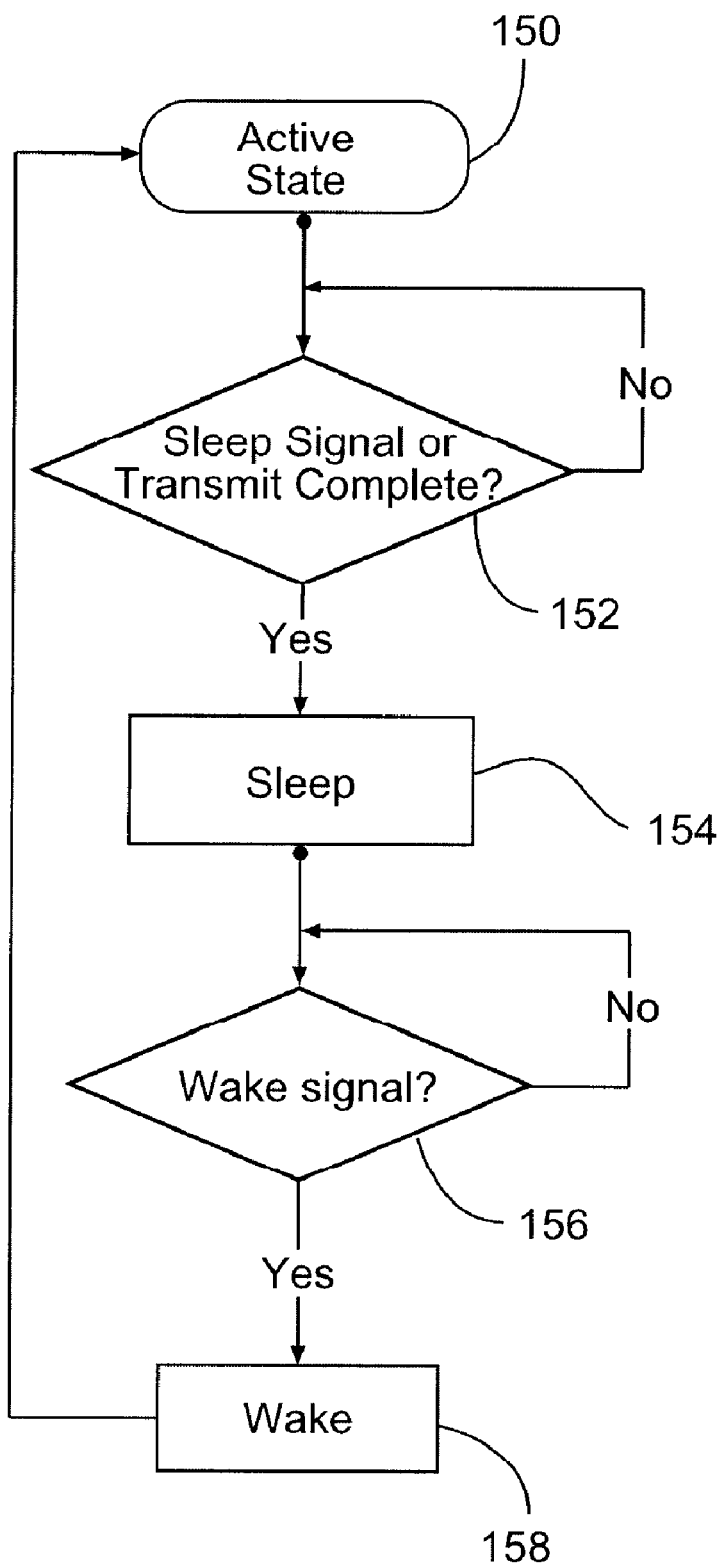
FIG. 17 shows a method of a wireless sensor unit transitioning between dormant and active.

Another technique stems from the fact that, at the end of the day, the system operator is aware that no more seismic tests will be conducted, and a single "sleep" message can be sent out through the network in step 152, allowing all radios to shut down transmission and in step 154 set the processors into a modified sleep mode. In this mode, the processor may awaken periodically in step 156 to sample the data at the radio receiver (which consumes much less power than the transmitter). When the operator is ready to use the wireless network, he transmits a signal to the nearest node of the mesh. This node, upon receiving the "wake up" signal, wakes in step 158 and in turn begins to transmit the signal to neighboring nodes. In a ripple fashion, the network moves from a dormant state to an active state 150 (see FIG. 17). Again, this is a novel way to utilize the fact that the entire network should be switched to dormant or active state at the same time.

In the claims, the word "comprising" is used in its inclusive sense and does not exclude other elements being present. The indefinite article "a" before a claim feature does not exclude more than one of the feature being present. Each one of the individual features described here may be used in one or more embodiments and is not, by virtue only of being described here, to be construed as essential to all embodiments as defined by the claims. Immaterial modifications may be made to the embodiments described here without departing from what is covered by the claims.

The invention claimed is:

1. A wireless network, comprising:
    wireless sensor units organized in groups of wireless sensor units, each wireless sensor unit comprising plural sensors and at least a wireless transceiver connected to communicate by wires or wirelessly with the plural sensors;
    each group of wireless sensor units including a terminal wireless sensor unit and intermediate wireless sensor units, each intermediate wireless sensor unit being configured to relay data through the intermediate wireless sensor units towards the terminal wireless sensor unit;
    the terminal wireless sensor unit in each group of wireless sensor units being adapted to communicate wirelessly with at least one backhaul unit of plural backhaul units on a first set of frequencies;
    the backhaul units being adapted to communicate with a central computer on a second set of frequencies different from the first set of frequencies; and
    each group of wireless sensor units operating on a different channel than adjacent groups of wireless sensor units.

2. The wireless network of claim 1 in which each group of the plural groups of wireless sensor units comprises a linear array of wireless sensor units.

3. The wireless network of claim 1 in which the wireless sensor units of at least one group are arrayed in a mesh pattern on a ground surface.

4. The wireless network of claim 1 in which wireless sensor units of each group of wireless sensor units are divided into at least a first group and a second group and the wireless sensor units of each group are configured so that members of the first group transmit while members of the second group receive.

5. The wireless network of claim 1 in which the wireless sensor units comprise ground motion sensors.

6. The method of claim 1 in which each backhaul unit of the plural backhaul units operates on a different channel from adjacent backhaul units.

7. A method of collecting data from wireless sensor units arranged in a network, the wireless sensor units being organized in groups of wireless sensor units, each group of wireless sensor units including a terminal wireless sensor unit and intermediate wireless sensor units, the method comprising the steps of:
    initiating distribution of control signals to the wireless sensor units;
    acquiring data with the wireless sensor units by sensing one or more physical parameters;
    each of the wireless sensor units transmitting the acquired data in response to the control signals through at least one of the plural groups of wireless sensor units towards a corresponding one of the terminal wireless sensor units, each group of wireless sensor units operating on a different channel from adjacent groups of wireless sensor units;
    each of the terminal wireless sensor units forwarding the acquired data from the wireless sensor units in the corresponding group to at least one of plural backhaul units, each backhaul unit of the plural backhaul units operating on a different channel from adjacent backhaul units; and each of the backhaul units collecting and forwarding the acquired data from the terminal wireless sensor units towards a central computer, in which, for each group of wireless sensor units and backhaul unit that the group of wireless units communicates with, the group of wireless sensor units communicates with the corresponding backhaul unit on a first set of frequencies and the corresponding backhaul unit communicates with the central computer on a second set of frequencies different from the first set of frequencies.

8. The method of claim 7 further comprising each wireless sensor unit delaying transmitting of at least a portion of the acquired data according to a prioritizing algorithm associated with each respective wireless sensor unit.

9. The method of claim 7 in which each wireless sensor unit comprises plural sensors and at least a wireless transceiver connected to communicate by wires or wirelessly with the plural sensors.

10. The method of claim 7 in which the wireless sensor units in each group of wireless sensor units are divided into at least a first group and a second group and wireless sensor units of the first group transmit while wireless sensor units of the second group receive.

11. The method of claim 7 in which upon receiving a transmit control signal instructing a transmit of acquired data, wireless sensor units transmit acquired data before distributing the transmit control signal to other wireless sensor units.

12. The method of claim 7 further comprising:
placing wireless sensor units in a sleep state during at least some time periods when the wireless sensor units are not acquiring data or transmitting acquired data; and
awaking the wireless sensor units from the sleep state with an initiating control signal.

13. The method of claim 12 in which the wireless sensor units comprise ground motion sensors and the initiating control signal is an initiation of a ground vibration.

14. The method of claim 7 in which the wireless sensor units comprise ground motion sensors.

15. The method of claim 7 in which each prioritizing algorithm comprises a random delay in the transmitting of the acquired data.

16. The method of claim 7 in which each prioritizing algorithm comprises transmitting a first portion of the acquired data before a second portion of the acquired data.

17. The method of claim 16 in which the first portion and the second portion have different resolution.

18. The method of claim 17 in which the acquired data is transmitted as bytes comprising bits, and the first portion and the second portion correspond to different bits.

19. The method of claim 7 in which each prioritizing algorithm comprises transmitting different portions of the acquired data based on one or more of resolution and bit position.

20. The method of claim 7 in which the groups of wireless sensor units are pre-set linear arrays.

21. The method of claim 7 further comprising organizing the wireless sensor units by laying out the wireless sensor units in a mesh and then self-organizing the wireless sensor units into the groups of wireless sensor units.

22. The method of claim 7 further comprising organizing the wireless sensor units by selecting for inclusion in each group of wireless sensor units a number of wireless sensor units that provides transmission of data acquired in a data acquisition period to the central computer within a time period equal to the data acquisition period.

23. The method of claim 7 in which one or more of the backhaul units collect and forward the acquired data from the terminal wireless sensor units towards a central computer through one or more relays.

* * * * *